UNITED STATES PATENT OFFICE.

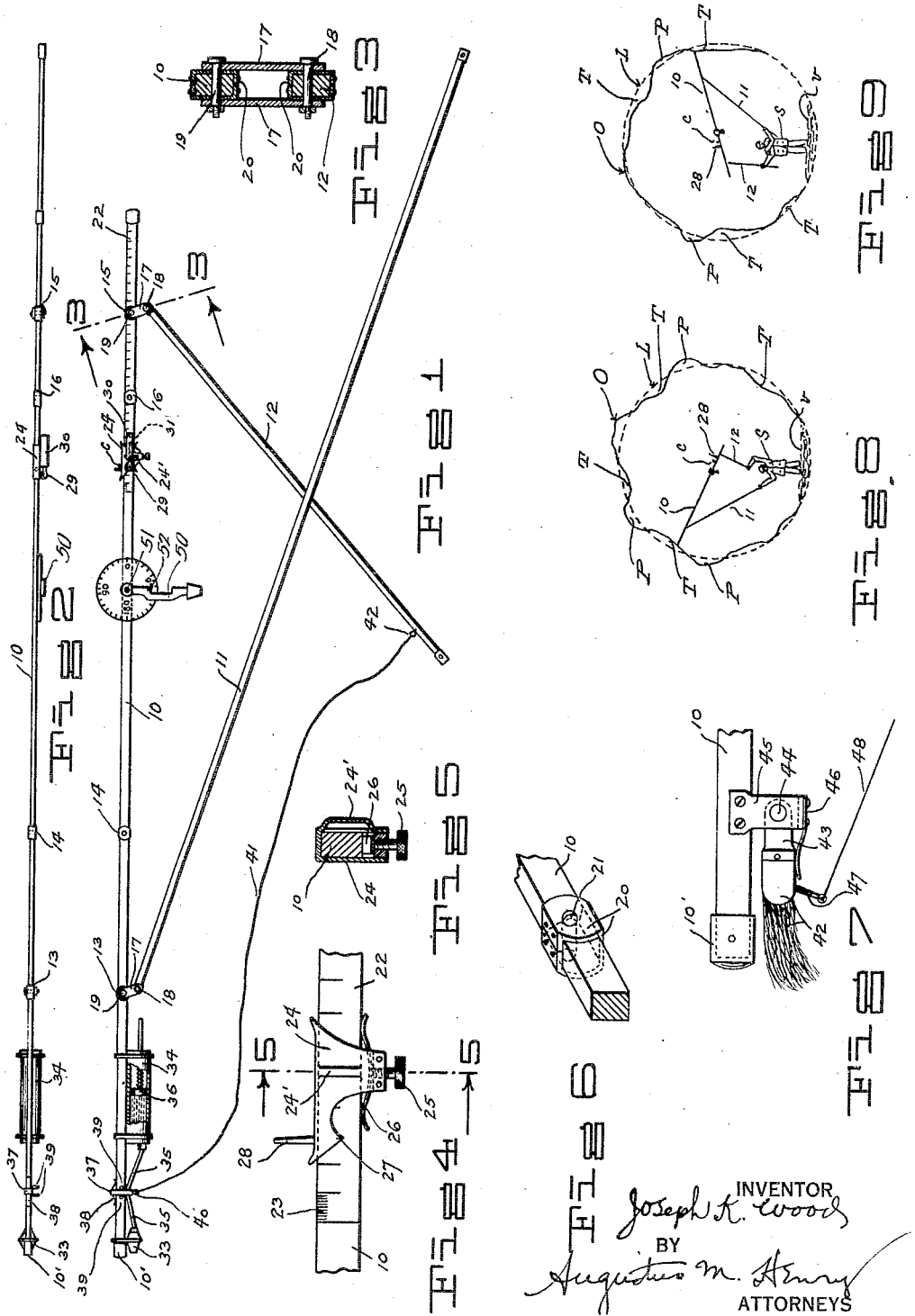

JOSEPH K. WOOD, OF NEW YORK, N. Y.

MEASURING APPARATUS.

1,309,270.

Specification of Letters Patent.

Patented July 8, 1919.

Application filed January 9, 1918. Serial No. 210,984.

*To all whom it may concern:*

Be it known that I, JOSEPH K. WOOD, a citizen of the United States of America, residing at 100 East 81st street, in the city, county, and State of New York, have invented new and useful Improvements in Measuring Apparatus, of which the following is a specification.

This invention relates to that class of apparatus used in civil and mining engineering for testing and verifying excavations or the like; although, as will be understood from what follows, the apparatus may well be applied to various other measuring uses, particularly where the distances and dimensions to be measured are out of reach of the ordinary yard stick or other measuring device in the hands of the person doing the measuring when such person is standing on the ground, as on the invert or floor of a tunnel, and not on a special and laboriously constructed support or scaffold.

Wherever the surface of the tunnel is gouged out beyond the "net" or theoretically perfect cross section of the tunnel at the point being examined, there is formed what is known as a "pocket." But the presence of and the necessity for detecting these pockets are not serious, whereas the protuberances, or "tights," must be looked for and detected so that they may be removed later. In a particular tunnel, the problem is to easily and quickly locate these tights by radial measurements relative to the theoretical center or axial line of the tunnel.

Heretofore these radial measurements have been made after the surveying party has stretched a taut line or cord, as a mason's cord line, in coincidence with the theoretical axial line of the tunnel, through the part of the tunnel to be examined for tights. In order to understand the difficulties of the methods previously in use, it should first be pointed out that the majority of tunnels is at least sixteen feet in diameter. This would locate the axial line of the tunnel at least seven feet above the invert or floor, which former term refers to the more or less flat floor of the tunnel, formed by loose earth, stones, etc., usually about a foot in depth. The old plans involved supplying an engineer with a hand-rod, or with a special apparatus having to be very carefully fixed and adjusted on some inanimate support preliminary to the examination for tights; and in the one case the hand-rod has had to have a length equal to or greater than the radius of the tunnel, and in the other case the special apparatus has had to have a swinging arm or testing rod of a length equal to or greater than the radius of the tunnel. In the case of the special apparatus, such as, for example, the well-known" sunflower" cross-section apparatus, great care and much time are required to anchor and set the apparatus each time the apparatus is arranged for operation. Every time the instrument is anchored and set, three laborious adjustments are necessary: the apparatus must be first set in line with the center line of the tunnel, then leveled, and then the elevation of the testing-arm pivot must be ascertained. Three men are continuously required, one to swing the testing arm, another to read the length and angle of the arm, and the other to take notes. In the case of the hand-rod, a makeshift arrangement even in the hands of a skilled engineer, a gang of laborers has always been compelled to accompany the engineer, in order frequently to change the positions of a pair of portable wooden horses, on which a temporary scaffold was formed by planks or the like, the engineer waiting each time for the scaffold to be erected so that he could stand on it and manipulate the hand-rod to examine for tights. Since these tests for tights have to be made only practically foot by foot, the amount of work in repeatedly erecting the scaffold or the special apparatus along the tunnel from end to end thereof is so great as to make this part of the tunnel construction very long drawn out, tedious, and expensive.

The prime object of the present invention is to provide an apparatus for testing for tights, of such a nature that one part may be grasped in one of the hands of the surveyor, and the other part in his other hand, so that the entire apparatus becomes entirely supported by and capable of being naturally manipulated by the surveyor, in other words, becomes a part of himself, to use a homely expression;—which apparatus, in its preferred form, also includes angle-measuring means carried by itself and never needing adjustment, whereby the apparatus is a complete, self-contained, lightweight, portable and always-ready surveying instrument capacitated for cross-section plotting. The construction is such that tunnels of diameters of sixteen feet or greater may be instantly and easily examined for tights by the surveyor standing on the invert or tunnel floor, and without having preliminarily to position the apparatus on any inanimate support, yet making true tests relative to the perpendicular distance of any examined surface of the tunnel relative to the axial line of the tunnel. In this latter connection it should be explained that a practical difficulty heretofore encountered in securing accurate measurements has been the inability of even experienced engineers to judge accurately by the eye that the testing arm or rod is held perpendicular to the axial line of the tunnel. The present apparatus comprises a structure including a plurality of pivotally interconnected members, one of which is a handle-member adapted to be grasped in one hand, another of which is a handle-member adapted to be grasped in the other hand, and another of which is a testing-rod, with the two handle-members so connected to the testing rod that the testing-rod has a free end which may be easily and quickly swung in an arc about a predetermined point on the testing-rod as a center, or through 360° about such center, by relative movements of the handle-members. Preferably one of the handle-members is longer than the other, the longer handle-member being the one pivotally connected to the testing-rod at a point closer to the arc-describing end of the testing-rod than the other handle-member. The testing-rod is preferably calibrated along a part of its length removed from the arc-describing end thereof, and carries an adjustable indicator having a projecting part adapted preliminarily to be set against the mason's cord line in the tunnel; the parts being so arranged that the person handling the apparatus may easily and quickly determine the perpendicular setting of the testing-rod relative to the axial line of the tunnel by placing the indicator against the mason's cord line and then slightly swinging the testing end of the testing-rod through an arc the cord subtending which is parallel to the axial line of the tunnel. Preferably also, the indicator on the testing rod is provided with a mounting on which may be detachably mounted an illuminating agent, as an electric bulb, adapted to illuminate the indicator, the mason's cord line and the calibrations of the testing rod; and also with a marking device, as a brush, or paint gun, on the arc-describing end of the testing rod, but in such position as not to give the rod a false length; with the paint gun, for instance, provided with operative connections to one of the handle-members, whereby the surveyor may shoot a charge of paint to cover a detected tight.

The invention will be more clearly understood from the following description, when taken in connection with the accompanying drawings, illustrating a preferred apparatus.

In these drawings,

Figure 1 is a side elevation of the complete apparatus, with the indicator having mounted thereon an illuminating agent, and with the arc-describing end of the testing-rod having mounted thereon a paint gun operatively connected to one of the handle-members;

Fig. 2 is a top plan view of the parts shown in Fig. 1;

Fig. 3 is an enlarged sectional view taken on the line 3—3 of Fig. 1;

Fig. 4 is an enlarged view showing the indicator on a part of the testing rod, on an enlarged scale;

Fig. 5 is a section on the line 5—5 of Fig. 4;

Fig. 6 is a perspective view on an enlarged scale, showing the construction of one of the four swivel points on the testing-rod to which the handle members may be selectively connected;

Fig. 7 is an enlarged view of the arc-describing end of the testing rod, showing a brush mounted thereon;

Fig. 8 is a detail view showing a tunnel cross-section, and also showing, diagrammatically, a surveyor using the new apparatus; and Fig. 9 is a view similar to Fig. 8, showing the apparatus in another adjustment.

Referring to Figs. 1 to 6, inclusive, the testing-rod is indicated at 10, and the handle-members are indicated at 11 and 12. The handle-member 11 may be pivotally connected to the swivel point 13 or 14 on the testing-rod, and the handle-member 12 may be pivotally connected to the swivel point 15 or 16 on the testing-rod, by means of the links 17, the pins 18 and the pins 19. As indicated in Fig. 6, each swivel point on the testing rod 10 is reinforced by a metallic member 20 screwed in place as shown, and a bearing for a pin is provided by boring through the member 20 and the testing-rod as indicated at 21.

Since tunnels as usually constructed generally vary in diameter between twelve and twenty-four feet, I deem it desirable to provide two sizes of apparatus, one with the testing-rod 10 nine feet long and the other with the testing-rod 10 twelve feet long with the handle-members of appropriate lengths, say according to the scale shown in Figs. 1 and 2.

A length of the testing-rod 10 removed from the arc-describing end 10' thereof, is calibrated in feet and tenths of feet from the arc-describing end 10', as indicated at 22. The scale may be further subdivided into hundredths of a foot as indicated at 23 in Fig. 4.

A metal, frictionally held, traveling indicator 24 is mounted on and adapted to ride along and be adjusted on the calibrated part of the testing rod. The construction of this indicator is most clearly shown in Figs. 4 and 5, the indicator being provided with an adjustable screw 25 acting against the leaf spring 26. The indicator has an index 27 for coaction with the calibrations on the testing-rod; and the indicator carries the projecting part or pin 28 arranged in line with the index 27 and perpendicular to the length of the testing rod.

In order that an illuminating agent may be readily mounted on the indicator so as, in all positions of the indicator, to illuminate the index 27, the pin 28, the calibrations on the testing rod, and the mason's cord line (see c in Figs. 8 and 9) when the pin 28 is placed against such cord line, the indicator is provided with a punched out loop portion 24'. In Figs. 4 and 5 the illuminating agent is not shown, but in Figs. 1 and 2 the illuminating agent is illustratively disclosed as comprising a bulb 29, a portable holder 30 for bulb and battery, spring clip 31 on the receptacle adapted to be wedged into the loop 24' of the indicator.

Means are also shown for marking, when desired, a located tight. In the embodiment of Figs. 1 and 2, this means is shown as comprising a paint-spraying nozzle 33 of any familiar construction, adapted to be placed in communication with a paint reservoir 34 by means of a length of rubber tubing 35. Reservoir 34 has in its rear end a spring-pushed piston 36; the tension of the spring being such that whenever the tube 35 is not pinched intermediate its ends paint will be sent to the nozzle 33 and sprayed over a surface beyond the end 10' of the testing rod. In order to maintain the tube 35 normally pinched and consequently to maintain the paint-applying means inoperative, a strap 37 is provided encircling the tube and the testing-rod and held by means of a leaf spring 38, in the position shown in Fig. 1, to pinch the tube 35. The strap 37 is held against displacement longitudinally of the testing-rod by means of a plurality of pins 39. The strap carries an eye 40 to which may be connected a cord 41 leading to an eye 42 on one of the handle-members. Whenever a tight is located, the surveyor may pull the cord 40, and draw the strap 37 away from the tube 35, whereupon the piston 36 will drive paint through the tube 35 and spray the paint through the nozzle 33, till such time as the pull on the cord 40 is released.

Another possible construction, alternative to that shown in Fig. 1 and described in the preceding paragraph, is shown in Fig. 7. Here a paint applying brush 42 is pivoted near the butt of its handle 43, as indicated at 44, in a bracket 45 fixed to the testing-rod 10, a leaf spring 46 on the bracket acting against the handle 43 to hold the brush 42 normally in the position illustrated. The brush handle carries a screw eye 47, to which is attached a cord 48, whereby when a tight is located, the end of the testing-rod may be moved into proximity to a paint pot, the cord 48 pulled to draw the brush away from the testing-rod, and the brush dipped in the pot.

Referring to Figs. 8 and 9, which represent end elevations of a circular tunnel, the outline of the tunnel is indicated at O. The circular line L is the theoretically perfect cross section of the tunnel called the net. Pockets P are shown wherever the surface of the tunnel is gouged out beyond the net. The tights are indicated at T. The floor or invert of the tunnel is shown at v. The mason's cord line, coinciding with the axial line of the tunnel, is indicated at c. It will be understood that, by using the present apparatus, scaffolding, and a gang of laborers necessary to continually build it up and take it down, are dispensed with. The surveyor S is seen holding the short arm 12 of his apparatus in his left hand and the long arm 11 in his right hand. In these Figs. 8 and 9 the surveyor is supposed to be facing the observer. As his arms are arranged in Fig. 8, he is testing what seems to be a tight to his right. As the surveyor's arms are arranged in Fig. 9, he is testing what seems to be a tight to his left. In shifting the apparatus from the position of Fig. 8 to that of Fig. 9, and just after the testing rod 10 has been moved in a clockwise direction in Fig. 8 to a point where the rod is vertical and above the mason's cord line, with the index 28 below such line, the surveyor must rearrange the parts to transfer the index above the mason's cord line, and to transfer the arm 11 to the right of the mason's cord line and the arm 12 to the left of the mason's cord line, preparatory to moving the testing rod further in a clockwise direction toward the position shown in Fig. 9. This rearrangement of the testing rod is easily done by first passing the arms 11 and 12 across each other to bring them to the position shown in Fig. 9, while lowering the testing rod, then transferring the outer tip of the testing rod to the right of the mason's cord line, and then raising the arms and the testing rod to dispose the index 28 to the left of the mason's cord line. In the case of any particular tunnel the indicator 24 is set so that its index 27 lies opposite the particular number of feet and tenths and hundredths of feet which represent the radius of the tunnel; the calibrations being provided over as much of the end portion of the testing rod near the inner end thereof as is necessary for all practical conditions. In order to test whether the testing-rod is perpendicular to the axial line c, the surveyor may swing the testing-rod back and forth lengthwisely of the tunnel about the point where the outer end of the testing-rod contacts with a suspected tight. After he has located the tight and determined that it is really a tight, he may, by rearranging the rod 10 so that the pin 28 of the indicator 24 is so arranged that the mason's cord line c is between the pin 28 and the suspected tight, ascertain the depth of the tight by first swinging the testing-rod lengthwisely of the tunnel to arrange the testing-rod perpendicularly to the mason's cord-line, and then note the number of calibrations between the mason's cord line and the index 27. The apparatus may be readily collapsed by laying the handle-members against and parallel with the testing-rod. Then the apparatus is very compact, and may be easily transported. At all times, the weight of the entire apparatus is inconsiderable. I have found that very good results have been obtained when I construct the testing-rod and the handle-members of white spruce, with the testing-rod ¾ of an inch thick and 1½ inches wide, and the handle-members ¾ of an inch thick and 1 inch wide.

An angle-measuring means is provided and carried by the testing rod 10. This means comprises a 360° circular scale 49, adapted to occupy a vertical plane, and a pendulum 50 suspended from a pivot 51 at the center of the scale and carrying an index 52 opposite the calibrations on the scale, is preferably mounted on the testing rod 10 in the field of illumination of the bulb 29. By these means the angle of any position of the testing rod, as well as the distance of the end 10' of the rod from the mason's cord line c, may be easily read; and a succession of such readings permits quick plotting of a tight or indeed of a complete cross-section of the tunnel.

While a particular embodiment of the invention is described, my invention is not to be limited to the details shown except in so far as such details may be specifically pointed out in the appended claims, because it is obvious that many different changes and alterations may be made without in the least departing from the spirit of the invention.

I claim:

1. Apparatus of the kind described, comprising a structure including a plurality of relatively movable members, one of which is a handle-member adapted to be grasped in one hand of the operator, another of which is a handle-member adapted to be grasped in the other hand of the operator, and another of which is a testing-member, the two-handle members each being pivotally connected to the testing-member so that the testing-member has a free end adapted to be swung in an arc about a predetermined point on the testing-member as a center, by relative movements of the handle-members.

2. Apparatus of the kind described, comprising a structure including a plurality of relatively movable members, one of which is a handle-member adapted to be grasped in one hand of the operator, another of which is a handle-member adapted to be grasped in the other hand of the operator, and another of which is a testing-member, the two handle-members being each pivotally so connected to the testing-member so that the testing-member has a free end adapted to be swung in an arc about a predetermined point on the testing-member as a center, by relative movements of the handle-members, one of the two handle-members being connected to the testing-member near one end of the testing-member and the other handle-member being connected to the testing-member near the other end of the testing-member.

3. Apparatus of the kind described, comprising a structure including a plurality of relatively movable members, one of which is a handle-member adapted to be grasped in one hand of the operator, another of which is a handle-member adapted to be grasped in the other hand of the operator, and another of which is a testing-member, the two handle-members being each pivotally connected to the testing-member so that the testing-member has a free end adapted to be swung in an arc about a predetermined point on the testing-member as a center, by relative movements of the handle-members, a link connection being provided between each handle-member and the testing-member.

4. Apparatus of the kind described, comprising a structure including a plurality of relatively movable members, one of which is a handle-member adapted to be grasped in one hand of the operator, another of which is a handle-member adapted to be grasped in the other hand of the operator, and another of which is a testing-member, the two handle-members being each pivotally so connected to the testing-member so that the testing-member has a free end adapted to be swung in an arc about a predetermined point on the testing-member as a center, by relative movements of the handle-members, the testing-member carrying calibrations near the end opposite to its free end.

5. Apparatus of the kind described, comprising a structure including a plurality of relatively movable members, one of which is a handle-member adapted to be grasped in one hand of the operator, another of which is a handle-member adapted to be grasped in the other hand of the operator, and another of which is a testing-member, the two handle-members being each pivotally connected to the testing-member so that the testing-member has a free end adapted to be swung in an arc about a predetermined point on the testing-member as a center, by relative movements of the handle-members, the testing-member carrying calibrations near the end opposite to its free end, said calibrations extending on both sides of the point where a handle-member is connected to the testing-member.

6. Apparatus of the kind described, comprising a structure including a plurality of relatively movable members, one of which is a handle-member adapted to be grasped in one hand of the operator, another of which is a handle-member adapted to be grasped in the other hand of the operator, and another of which is a testing-member, the two handle-members being each pivotally connected to the testing-member so that the testing-member has a free end adapted to be swung in an arc about a predetermined point on the testing-member as a center, by relative movements of the handle-members, and an adjustable indicator on the testing-member.

7. Apparatus of the kind described, comprising a structure including a plurality of relatively movable members, one of which is a handle-member adapted to be grasped in one hand of the operator, another of which is a handle-member adapted to be grasped in the other hand of the operator, and another of which is a testing-member, the two handle-members being each pivotally connected to the testing-member so that the testing-member has a free end adapted to be swung in an arc about a predetermined point on the testing-member as a center, by relative movements of the handle-members, the testing-member carrying calibrations near the end opposite to its free end, and a projecting part on the testing-member adapted to be placed against a mason's cord line or the like during use of the apparatus for testing.

8. Apparatus of the kind described, comprising a structure including a plurality of relatively movable members, one of which is a handle-member adapted to be grasped in one hand of the operator, another of which is a handle-member adapted to be grasped in the other hand of the operator, and another of which is a testing-member, the two handle-members being each pivotally connected to the testing-member so that the testing-member has a free end adapted to be swung in an arc about a predetermined point on the testing-member as a center, by relative movements of the handle-members, the free end of the testing-rod carrying a device on which a marking element may be mounted in position to avoid giving the testing-member a false length.

9. Apparatus of the kind described, comprising a structure including a plurality of relatively movable members, one of which is a handle-member adapted to be grasped in one hand of the operator, another of which is a handle-member adapted to be grasped in the other hand of the operator, and another of which is a testing-member, the two handle-members being each pivotally connected to the testing-member so that the testing-member has a free end adapted to be swung in an arc about a predetermined point on the testing-member as a center, by relative movements of the handle-members, the testing-rod carrying a projecting part adapted to be set against a mason's cord line or the like during use of the apparatus for testing, and a device carried by the apparatus whereby an illuminating element may be mounted on the apparatus adjacent to said projecting part.

10. Apparatus of the kind described, comprising a structure including a plurality of relatively movable members, one of which is a handle-member adapted to be grasped in one hand of the operator, another of which is a handle-member adapted to be grasped in the other hand of the operator, and another of which is a testing-member, the two handle-members being each pivotally connected to the testing-member so that the testing-member has a free end adapted to be swung in an arc about a predetermined point on the testing-member as a center, by relative movements of the handle-members, and angle-measuring means carried by one of said members.

11. Apparatus of the kind described, comprising a structure including a plurality of relatively movable members, one of which is a handle-member adapted to be grasped in one hand of the operator, another of which is a handle-member adapted to be grasped in the other hand of the operator, and another of which is a testing-member, the two handle-members being each pivotally connected to the testing-member so that the testing-member has a free end adapted to be swung in an arc about a predetermined point on the testing-member as a center, by relative movements of the handle-members, the testing-rod carrying a projecting part adapted to be set against a mason's cord line or the like during use of the apparatus for testing, and a device carried by the apparatus whereby an illuminating element may be mounted on the apparatus adjacent to said projecting part, and angle-measuring means carried by one of said members, said angle-measuring means including a fixed part and a pendulum carrying an index disposed in the field of illumination of said element.

In testimony whereof I have signed my name to this specification.

JOSEPH K. WOOD.

Copies of this patent may be obtained for five cents each, by addressing the "Commissioner of Patents, Washington, D. C."